(12) United States Patent
DiGiovanni

(10) Patent No.: US 10,030,450 B2
(45) Date of Patent: Jul. 24, 2018

(54) POLYCRYSTALLINE COMPACTS INCLUDING CRUSHED DIAMOND NANOPARTICLES, CUTTING ELEMENTS AND EARTH BORING TOOLS INCLUDING SUCH COMPACTS, AND METHODS OF FORMING SAME

(71) Applicant: Baker Hughes Incorporated, Houston, TX (US)

(72) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 467 days.

(21) Appl. No.: 13/935,263

(22) Filed: Jul. 3, 2013

(65) Prior Publication Data

US 2015/0008047 A1 Jan. 8, 2015
US 2018/0135356 A9 May 17, 2018

Related U.S. Application Data

(63) Continuation-in-part of application No. 13/275,872, filed on Oct. 18, 2011, now Pat. No. 8,936,659, which is a continuation-in-part of application No. 13/077,426, filed on Mar. 31, 2011, now Pat. No. 9,776,151.

(60) Provisional application No. 61/324,142, filed on Apr. 14, 2010.

(51) Int. Cl.
| | |
|---|---|
| *E21B 10/00* | (2006.01) |
| *B01J 3/06* | (2006.01) |
| *E21B 10/567* | (2006.01) |
| *E21B 10/55* | (2006.01) |
| *C22C 26/00* | (2006.01) |
| *B22F 5/00* | (2006.01) |

(52) U.S. Cl.
CPC ............ *E21B 10/567* (2013.01); *C22C 26/00* (2013.01); *E21B 10/55* (2013.01); *B22F 2005/001* (2013.01); *B22F 2304/054* (2013.01); *B22F 2304/056* (2013.01); *B22F 2304/058* (2013.01)

(58) Field of Classification Search
CPC .... B01J 3/06; B01J 3/062; B01J 3/067; E21B 10/00
USPC ............................................ 51/307; 175/336
See application file for complete search history.

(56) References Cited

U.S. PATENT DOCUMENTS

| | | | |
|---|---|---|---|
| 3,745,623 | A | 7/1973 | Rocco et al. |
| 4,224,380 | A | 9/1980 | Bovenkerk et al. |
| 5,127,923 | A | 7/1992 | Bunting et al. |
| 7,820,130 | B2 | 10/2010 | Khabashesku et al. |

(Continued)

*Primary Examiner* — Pegah Parvini
(74) *Attorney, Agent, or Firm* — TraskBritt

(57) ABSTRACT

A polycrystalline compact comprises a plurality of diamond grains of micron size, submicron size, or both, and a plurality of crushed diamond nanoparticles disposed in interstitial spaces between the plurality of diamond grains. A method of forming a polycrystalline compact comprises combining a plurality of micron and/or submicron-sized diamond grains and a plurality of crushed diamond nanoparticles to form a mixture and sintering the mixture in a presence of a binder to form a polycrystalline hard material comprising a plurality of inter-bonded diamond grains and diamond nanoparticles. Cutting elements comprising a polycrystalline compact and earth-boring tools bearing such compacts are also disclosed.

18 Claims, 3 Drawing Sheets

(56) References Cited

U.S. PATENT DOCUMENTS

| | | |
|---|---|---|
| 7,858,186 B2 | 12/2010 | Khabashesku et al. |
| 8,003,215 B2 | 8/2011 | Khabashesku et al. |
| 2005/0155455 A1* | 6/2005 | Dobbs ................. B22F 9/20 75/354 |
| 2008/0057145 A1* | 3/2008 | Hall ..................... B01J 3/06 425/77 |
| 2008/0142276 A1* | 6/2008 | Griffo ............. E21B 10/5735 175/432 |
| 2009/0260895 A1* | 10/2009 | Vail ..................... B01J 3/062 175/434 |
| 2011/0031033 A1* | 2/2011 | Mourik ................ C22C 26/00 175/428 |
| 2011/0031034 A1 | 2/2011 | DiGiovanni et al. |
| 2011/0061942 A1 | 3/2011 | DiGiovanni |
| 2011/0088954 A1 | 4/2011 | DiGiovanni et al. |
| 2011/0120782 A1* | 5/2011 | Cooley ............. B24D 99/005 175/432 |
| 2011/0200163 A1 | 8/2011 | Oda |
| 2011/0226532 A1 | 9/2011 | Jonker et al. |
| 2012/0034464 A1* | 2/2012 | Chakraborty ......... B82Y 30/00 428/402 |
| 2012/0211284 A1 | 8/2012 | DiGiovanni |
| 2013/0068541 A1 | 3/2013 | DiGiovanni et al. |

\* cited by examiner

POLYCRYSTALLINE COMPACTS INCLUDING CRUSHED DIAMOND NANOPARTICLES, CUTTING ELEMENTS AND EARTH BORING TOOLS INCLUDING SUCH COMPACTS, AND METHODS OF FORMING SAME

CROSS-REFERENCE TO RELATED APPLICATIONS

This application is a continuation-in-part of U.S. patent application Ser. No. 13/275,872, filed Oct. 18, 2011, now U.S. Pat. No. 8,936,659, issued Jan. 20, 2015, which is a continuation-in-part of U.S. patent application Ser. No. 13/077,426, filed Mar. 31, 2011, now U.S. Pat. No. 9,776,151, issued Oct. 3, 2017, which claims benefit of U.S. Provisional Patent Application No. 61/324,142, filed Apr. 14, 2010.

FIELD

The present disclosure relates generally to polycrystalline diamond compacts, which may be used, for example, as cutting elements for earth-boring tools, and more particularly to polycrystalline diamond compacts including diamond nanoparticles, to methods of forming such compacts, and to cutting elements and earth-boring tools comprising such compacts.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements fixedly attached to a bit body of the drill bit. Roller cone earth-boring rotary drill bits may include cones mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), which act as cutting faces of a polycrystalline diamond material. Polycrystalline diamond material is material that includes inter-bonded particles in the form of grains or crystals of diamond material. In other words, polycrystalline diamond material includes direct, inter-granular bonds between the grains or crystals of diamond material. The terms "grain," "crystal," and "particle" are used synonymously and interchangeably herein.

PDC cutting elements are conventionally formed by sintering and bonding together relatively small diamond grains under conditions of high temperature and high pressure in the presence of a catalyst (e.g., cobalt, iron, nickel, or alloys and mixtures thereof) to form a layer (referred to as a "compact" or "table") of polycrystalline diamond (PCD) material on a cutting element substrate. These processes are often referred to as high-temperature/high-pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may liquefy and diffuse into the diamond grains during sintering and serve as a catalyst (which may also be characterized as a binder) for forming the inter-granular diamond-to-diamond bonds, and the resulting diamond table, from the diamond grains. In other methods, powdered catalyst material may be mixed with the diamond grains prior to sintering the grains together in an HTHP process.

Upon formation of a diamond table using an HTHP process, catalyst material may remain in interstitial spaces between the grains of diamond in the resulting PDC. The presence of the catalyst material in the diamond table may contribute to thermal damage in the diamond table when the cutting element is heated during use, due to friction at the contact point between the cutting element and the formation.

Polycrystalline diamond (PCD) typically contains more than 80 volume percent sintered diamond grains, with the balance a binder phase. As noted above, this binder phase is conventionally provided via infiltration from a supporting cemented carbide substrate, but may also be incorporated into the starting diamond powder as an admixture. The diamond grains typically lie within the 1 to 50 micron size range, but there is significant interest in incorporating a nanodiamond grain component, which may comprise a substantial portion, for increased PCD abrasion resistance, fracture toughness, and thermal stability. Such enhanced performance is believed to be attributable to increased diamond percent volume, augmented diamond particle inter-bonding, and reduction in catalyst material volume in the PCD.

However, challenges exist when trying to incorporate nanoparticles in bulk sintering processes including PCD. During polycrystalline diamond compact synthesis, for example, the diamond nanoparticles may dissolve in the liquid state, infiltrating binder from the substrate or admixed binder under HTHP process conditions, resulting in the loss of the beneficial characteristics of abrasion resistance, fracture toughness, and thermal stability provided by the presence of the diamond nanoparticles. Further, when a conventional cobalt-cemented tungsten carbide substrate is employed, sintering quality may be compromised due to the loss of binder volume available to the sintering process. This phenomenon becomes more evident when relatively higher concentrations of diamond nanoparticles, for example, greater than about ten percent by volume, are employed to form PCD. In addition, the presence of tightly packed diamond nanoparticles in a volume of diamond grains undergoing HTHP processing inhibits infiltration of liquid-state binder from the substrate through the diamond table, causing a less well sintered region in the diamond table as distance increases from the interface between the diamond table and the substrate, resulting in poor abrasion resistance and compromised mechanical integrity of the diamond table.

BRIEF SUMMARY

In some embodiments, a method of fabricating polycrystalline diamond includes encapsulating micron-sized diamond grains and crushed diamond nanoparticles in a canister, and subjecting the encapsulated diamond particles and crushed diamond nanoparticles in the presence of a binder to a pressure of at least 5.0 GPa and a temperature of at least 1000° C. to form inter-granular bonds between the diamond grains and the diamond nanoparticles.

A polycrystalline compact includes a plurality of grains of diamond material and a plurality of crushed diamond nanoparticles disposed in interstitial spaces between, and bonded to, the plurality of grains of diamond material. The crushed diamond nanoparticles are bonded to the grains of diamond material by subjecting the crushed diamond nanoparticles and the grains of diamond material in the presence of a binder to a pressure of at least 5.0 GPa and a temperature of at least 1000° C.

An earth-boring tool includes a bit body and a polycrystalline diamond compact secured to the bit body. The polycrystalline compact comprises a plurality of grains of diamond material and a plurality of crushed diamond nanoparticles disposed in interstitial spaces between and bonded to, the grains of diamond material. The plurality of crushed diamond nanoparticles are bonded to the grains of diamond material by subjecting the crushed diamond nanoparticles and the grains of diamond material in the presence of a binder to a pressure of at least 5.0 GPa and a temperature of at least 1000° C.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of some embodiments of the disclosure when read in conjunction with the accompanying drawings, in which:

DETAILED DESCRIPTION

Figure 1A:
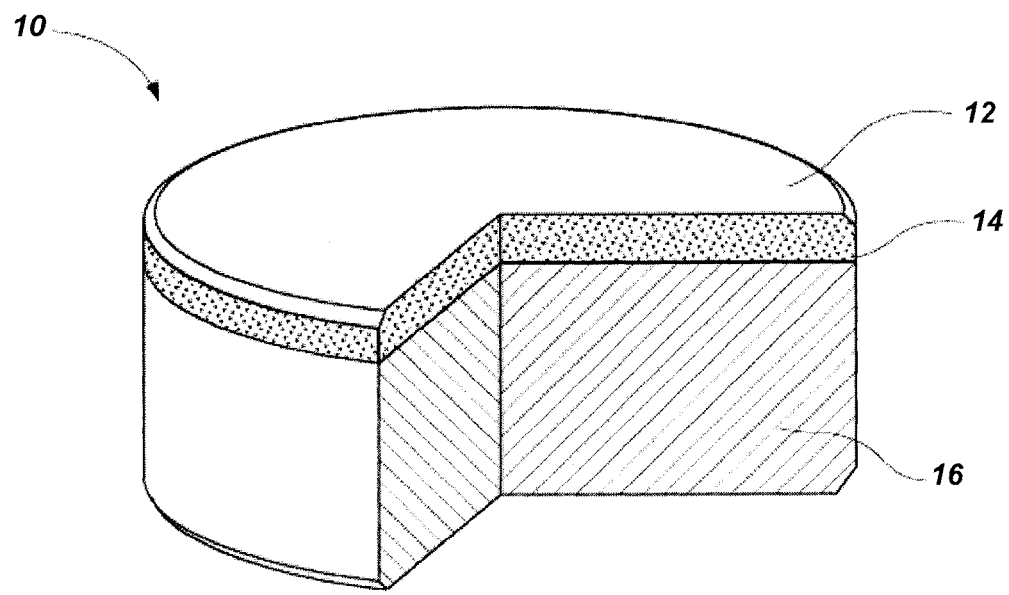
FIG. 1A is a partial cut-away perspective view illustrating an embodiment of a cutting element comprising a polycrystalline compact of the present disclosure.

The illustrations presented herein are not actual views of any particular polycrystalline compact, microstructure of a polycrystalline compact, particle, cutting element, or earth-boring tool, and are not drawn to scale, but are merely idealized representations employed to describe the present disclosure. Additionally, elements common between figures may retain the same numerical designation.

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

As used herein, the term "particle" means and includes any coherent volume of solid matter having an average dimension of about 2 mm or less. Grains (i.e., crystals) and coated grains are types of particles. As used herein, the term "nanoparticle" means and includes any particle having an average particle diameter of about 500 nm or less. Nanoparticles include grains in a polycrystalline hard material having an average grain size of about 500 nm or less.

As used herein, the term "nanodiamond" means and includes any single or polycrystalline or agglomeration of nanocrystalline carbon material comprising a mixture of sp-3 and sp-2 bonded carbon wherein the individual particle or crystal whether singular or part of an agglomerate is primarily made up of sp-3 bonds. Commercially, nanodiamonds are derived from detonation sources (UDD or ultra-dispersed diamond) and crushed sources and can be naturally occurring or manufactured synthetically. Naturally occurring nanodiamond includes the natural lonsdaleite phase identified with meteoric deposits.

As used herein, the term "crushed nanodiamond" means and includes synthetic or natural nanocrystalline diamond, or combinations thereof, that has been ground, milled, attrited, or otherwise comminuted from a larger-sized diamond crystal to form single-crystal particles or agglomerations of single-crystal particles.

As used herein, the term "polycrystalline hard material" means and includes any material comprising a plurality of grains or crystals of the material that are bonded directly together by inter-granular bonds. The crystal structures of the individual grains of polycrystalline hard material may be randomly oriented in space within the polycrystalline hard material.

As used herein, the term "polycrystalline compact" means and includes any structure comprising a polycrystalline hard material comprising inter-granular bonds formed by a process that involves application of pressure (e.g., compaction) to the precursor material or materials used to form the polycrystalline hard material.

As used herein, the term "inter-granular bond" means and includes any direct atomic bond (e.g., covalent, metallic, etc.) between atoms in adjacent grains of material.

As used herein, the terms "catalyst material," "binder material," "binder," and "metallic binder" each mean and include any material that is capable of catalyzing the formation of inter-granular bonds between grains of hard material during a sintering process (e.g., an HTHP process). For example, catalyst materials for diamond include cobalt, iron, nickel, other elements from Group VIII-A of the periodic table of the elements, and alloys thereof including without limitations Co—Ni, Co—Fe, Ni—Fe, INCONEL® and HASTALLOY® alloys.

As used herein, the term "hard material" means and includes any material having a Knoop hardness value of about 3,000 Kg/mm$^2$ (29,420 MPa) or more. Hard materials include, for example, diamond and cubic boron nitride.

FIG. 1A is a simplified, partially cut-away perspective view of an embodiment of a cutting element 10 of the present disclosure. The cutting element 10 includes a polycrystalline compact in the form of a layer of hard polycrystalline hard material 12, also known in the art as a polycrystalline table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

In some embodiments, the polycrystalline hard material 12 comprises polycrystalline diamond. In such embodiments, the cutting element 10 may be referred to as a PDC cutting element.

Figure 1B:
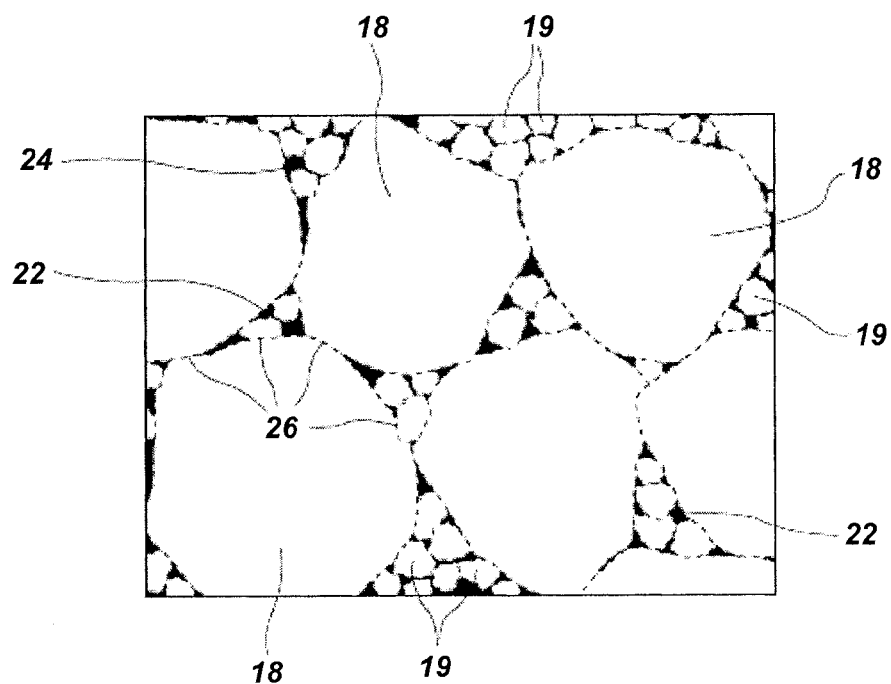
FIG. 1B is a simplified drawing showing how a microstructure of the polycrystalline compact of FIG. 1A may appear under magnification, and illustrates inter-bonded and interspersed larger and smaller grains of hard material.

FIG. 1B is an enlarged simplified view illustrating how a microstructure of the polycrystalline hard material 12 (FIG. 1A) of the cutting element 10 may appear under magnification. As discussed in further detail below, the polycrystalline hard material 12 may include inter-bonded micron-sized grains 18 of diamond material. The polycrystalline hard material 12 also includes other, smaller crushed diamond particles 19 (e.g., diamond nanoparticles (nanodiamond)) disposed in interstitial spaces 22 between the micron-sized inter-bonded grains 18 of diamond material and inter-bonded therewith as indicated at 26. In some embodiments, and as shown in FIG. 1B, the grains 18 of diamond material in the polycrystalline hard material 12 may have a substantially uniform, mono-modal grain size distribution, and the crushed diamond nanoparticles 19 may likewise be of substantially uniform size. In some embodiments, a catalyst material 24 may reside in regions of interstitial spaces 22 unoccupied by crushed diamond nanoparticles 19.

In additional embodiments, one or both of the grains 18 and crushed diamond nanoparticles 19 of the polycrystalline hard material 12 may have a multi-modal (e.g., bi-modal, tri-modal, etc.) grain size distribution. For example, the polycrystalline hard material 12 may comprise a multi-modal grain size distribution as disclosed in at least one of U.S. Patent Application Publication No. US 2011/0031034 A1, published Feb. 10, 2011, and titled "Polycrystalline Compacts Including In-Situ Nucleated Grains, Earth-Boring Tools Including Such Compacts, and Methods of Forming Such Compacts and Tools;" U.S. Patent Application Publication No. US 2011/0061942 A1, published Mar. 17, 2011, and titled "Polycrystalline Compacts Having Material Disposed in Interstitial Spaces Therein, Cutting Elements and Earth-Boring Tools Including Such Compacts, and Methods of Forming Such Compacts;" and U.S. Patent Application Publication No. US 2011/0088954 A1, published Apr. 21, 2011, and titled "Polycrystalline Compacts Including Nanoparticulate Inclusions, Cutting Elements and Earth-Boring Tools Including Such Compacts, and Methods of Forming Such Compacts;" the disclosures of each of which are incorporated herein in their entireties by this reference.

More specifically, polycrystalline hard material 12 may include interspersed and inter-bonded diamond grains 18 and crushed diamond nanoparticles 19 that form a three-dimensional network of diamond material. The diamond grains 18 and/or the smaller crushed diamond nanoparticles 19 may have average particle dimensions (e.g., mean diameters) of about 1 mm or less, about 0.1 mm or less, about 0.01 mm or less, about 1 μm or less, about 0.1 μm or less, or even about 0.01 μm or less. That is, the larger diamond grains 18 may include micron-sized diamond particles (diamond grains in a range from about 1 μm to about 500 μm (0.5 mm)) and submicron-sized diamond particles (diamond grains in a range from about 500 nm (0.5 μm) to about 1 μm). The crushed diamond nanoparticles 19 may have an average particle diameter of about 500 nm or less, such as from about 5 nm to about 150 nm. The crushed diamond nanoparticles 19 may each be single-crystal diamond, and may be substantially free of non-diamond carbon.

In some embodiments, the larger diamond grains 18 may be one or both of micron-sized diamond particles and submicron-sized particles. Interstitial spaces are present between the inter-bonded diamond grains 18 and the crushed diamond nanoparticles 19 of the polycrystalline hard material 12. These interstitial spaces may be at least partially filled with a solid substance, such as a metal solvent catalyst material 24 (e.g., iron, cobalt, nickel, or an alloy or mixture thereof). In other embodiments, the interstitial spaces may include empty voids within the polycrystalline hard material 12 free of a solid or liquid substance (although a gas, such as air, may be present in the voids). Such empty voids may be formed by removing (e.g., leaching) solid material out from the interstitial spaces after forming the polycrystalline hard material 12. In yet further embodiments, the interstitial spaces may be at least partially filled with a solid substance in one or more regions of the polycrystalline hard material, while the interstitial spaces in one or more regions of the polycrystalline hard material 12 include empty voids.

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline hard material 12 (e.g., a polished and etched surface of the polycrystalline hard material 12). Commercially available vision systems are often used with such microscopy systems, and these vision systems are capable of measuring the average grain size of grains within a microstructure.

Referring again to FIGS. 1A and 1B, the volume occupied by the crushed diamond nanoparticles 19 in the polycrystalline hard material 12 may be in a range extending from about 0.01% to about 99% of the volume of the polycrystalline hard material 12, such as from about 0.05% to about 50% of the volume of the polycrystalline hard material 12, or from about 0.1% to about 10% of the volume of the polycrystalline hard material 12. The weight percentage of the crushed diamond nanoparticles 19 in the polycrystalline hard material 12 may be in a range extending from about 0.01% to about 99% by weight, such as from about 0.05% to about 50% by weight or from about 0.1% to about 10% by weight.

In embodiments in which the polycrystalline hard material 12 includes polycrystalline diamond, the catalyst material 24 may be a Group VIII-A element (e.g., iron, cobalt, nickel, etc.) or an alloy thereof, and the catalyst material 24 may be between about one tenth of one percent (0.1%) and about ten percent (10%) by volume of the polycrystalline hard material 12.

The layer of polycrystalline hard material 12 of the cutting element 10 may be formed using HTHP processes. Such processes, and systems for carrying out such processes, are generally known in the art and not described in detail herein. In some embodiments, the polycrystalline hard material 12 may be formed on a supporting substrate 16 (as shown in FIG. 1A) of cemented tungsten carbide or another suitable substrate material in a conventional HTHP process of the type described, by way of non-limiting example, in U.S. Pat. No. 3,745,623, issued Jul. 17, 1973, and titled "Diamond Tools for Machining," or may be formed as a freestanding polycrystalline hard material 12 (i.e., without the supporting substrate 16) in a similar conventional HTHP process as described, by way of non-limiting example, in U.S. Pat. No. 5,127,923, issued Jul. 7, 1992, and titled "Composite Abrasive Compact Having High Thermal Stability," the disclosures of each of which are incorporated herein in their entireties by this reference. In some embodiments, the catalyst material 24 may be supplied from the supporting substrate 16 during an HTHP process used to form the polycrystalline hard material 12. For example, the substrate 16 may comprise a diamond enhanced cobalt-cemented tungsten carbide material as described in U.S. Patent Application Publication No. US 2011/0226532 A1, published Sep. 22, 2011, and titled "Insert for an Attack Tool, Method for Making Same and Tools Incorporating Same;" and U.S. Patent Application 2011/0020163, published Jan. 27, 2011, and titled "Super-Hard Enhanced Hard-Metals;" the disclosures of each of which are incorporated herein in their entireties by this reference. The cobalt of the cobalt-cemented tungsten carbide may serve as the catalyst material 24 during the HTHP process.

Figure 2:
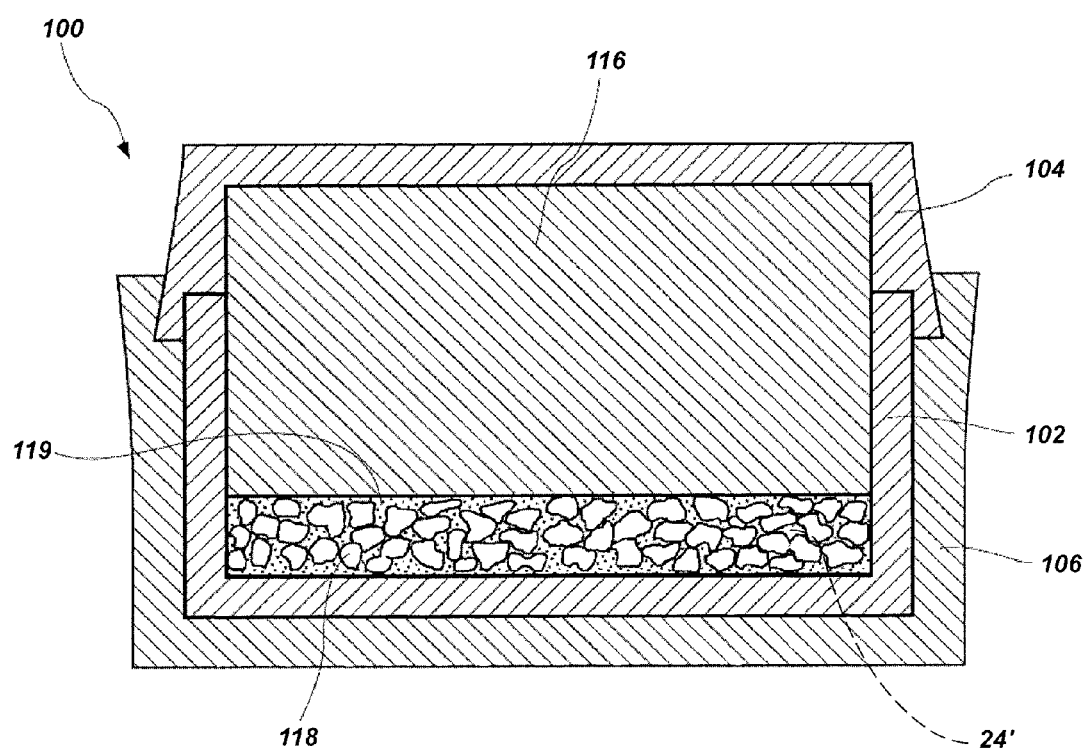
FIG. 2 is a simplified cross-sectional view illustrating a mixture of diamond grains and diamond nanoparticles encapsulated within a container in preparation for subjecting the container and the mixture therein to an HTHP sintering process to form a polycrystalline diamond compact cutting element.

FIG. 2 is a simplified cross-sectional view illustrating a mixture of diamond grains and diamond nanoparticles encapsulated within a container in preparation for subjecting the container and the mixture therein to an HTHP sintering process to form a polycrystalline diamond compact cutting element, such as the cutting element 10 shown in FIGS. 1A and 1B. As depicted in FIG. 2, diamond grains 118 may be positioned within a canister 100 (e.g., a metal canister) prior to undergoing the HTHP process used to form polycrystalline hard material 12. The diamond grains 118 may include grains or crystals of micron- and/or submicron-sized diamond (e.g., diamond grit), which will ultimately form the diamond grains 18 in the sintered polycrystalline hard material 12 (see FIGS. 1A and 1B).

Crushed diamond nanoparticles 119 also may be present in the spaces between the diamond grains 118 in the canister 100. As shown in FIG. 2, the canister 100 may include an inner cup 102 in which the diamond grains and the crushed diamond nanoparticles 119 may be provided. If the cutting element 10 is to include a substrate 16, a substrate blank 116 may, optionally also be provided in the inner cup 102 over or under the diamond grains 118 and the crushed diamond nanoparticles 119, and may ultimately be encapsulated in the canister 100. The canister 118 may include a top end piece 104 and a bottom end piece 106, which may be assembled and bonded together (e.g., swage bonded) around the inner cup 102 with the diamond grains 118, the crushed diamond nanoparticles 119, and the optional substrate blank 116 therein.

To form the polycrystalline hard material 12 (FIG. 1A) in an HTHP process, a particulate mixture including the diamond grains 118 (i.e., particles of micron-sized diamond material) and the crushed diamond nanoparticles 119 may be subjected to elevated temperatures (e.g., temperatures greater than about 1,000° C.) and elevated pressures (e.g., pressures greater than about 5.0 gigapascals (GPa)). These conditions may promote the formation of inter-granular bonds 26 (FIG. 1B) between the diamond grains 118 and the crushed diamond nanoparticles 119 without entirely consuming the crushed diamond nanoparticles 119. In some embodiments, the particulate mixture may be subjected to a pressure greater than about 6.0 GPa, greater than about 8.0 GPa, or even greater than about 10.0 GPa. The particulate mixture may be subjected to a temperature from about 1,200° C. to about 2,000° C., such as a temperature greater than about 1,500° C., in the HTHP process. HTHP conditions may be maintained for a period of time from about thirty (30) seconds to about sixty (60) minutes to sinter the particles and form the polycrystalline hard material 12.

In some embodiments, the particulate mixture may include a powder or a powder-like substance. In other embodiments, however, the particulate mixture, which may comprise a solution, slurry, gel, or paste, may be processed by (e.g., on or in) another material form, such as a tape or film, which, after stacking to a selected thickness, and undergoing subsequent thermal and or chemical processes to remove the one or more organic processing aids, may be subjected to an HTHP process. One or more organic materials (e.g., processing aids) also may be included with the particulate mixture to facilitate processing. For example, some suitable materials are described in U.S. Patent Application Publication No. US 2012/0211284 A1, published Aug. 23, 2012, and titled "Methods of Forming Polycrystalline Compacts, Cutting Elements and Earth-Boring Tools," the disclosure of which is incorporated herein in its entirety by this reference.

In some embodiments, the crushed diamond nanoparticles 119 may be functionalized with one or more functional groups, such as to control or prevent agglomeration and promote uniform or controlled distribution into the pre-HPHT macro diamond synthesis chemistry. For example, functionalization of the crushed diamond nanoparticles 119 may be performed as described in U.S. Patent Application Publication No. US 2013/0068541, published Mar. 21, 2013, and titled "Methods of Fabricating Polycrystalline Diamond, and Cutting Elements and Earth-Boring Tools Comprising Polycrystalline Diamond;" U.S. Pat. No. 8,003,215, issued Aug. 23, 2011, and titled "Fluorinated Nanodiamond as a Precursor for Solid Substrate Surface Coating Using Wet Chemistry;" U.S. Pat. No. 7,858,186, issued Dec. 28, 2010, and titled "Fluorinated Nanodiamond as a Precursor for Solid Substrate Surface Coating Using Wet Chemistry;" and U.S. Pat. No. 7,820,130, issued Oct. 26, 2010, and titled "Functionalization of Nanodiamond Powder Through Fluorination and Subsequent Derivatization Reactions;" the disclosures of each of which are incorporated herein in their entirety by this reference.

The crushed diamond nanoparticles 119 may be added to the canister 100 as a dry bulk powder, a wet aqueous medium, a solvent-based medium, or any other form. For example, the crushed diamond nanoparticles 119 may be in a composition having the form of a liquid (e.g., a suspension or slurry), gel, paste, etc. The crushed diamond nanoparticles 119 may be cleaned and distributed in a liquid or solution by magnetic stirring, ball milling, attrition milling, ultrasonication, or any other method or combination of methods. Dispersed and/or stabilized liquids, gels, or pastes can be dried, sieved, pressed, or injection molded, for example, into die capsules for vacuum heat treating and subsequent HPHT processing.

In the canister 100, before applying pressure, the diamond grains 118 may have a packing fraction from about 80% to about 99% (i.e., with a void space of between about 20% and about 1% of the total volume), such as from about 85% to about 95% (i.e., with a void space of between about 5% and about 15% of the total volume). The crushed diamond nanoparticles 119 may occupy void space between the diamond grains 118 (e.g., micron-sized diamond), such that the crushed diamond nanoparticles 119 are in proximity to the diamond grains 118. For example, in some embodiments the diamond nanoparticles may substantially fill the void space between the diamond grains 118. In other embodiments, a binder 24' (e.g., a metallic binder) may partially fill the void space between the diamond grains 118. A conventional HTHP process for forming the polycrystalline hard material 12 and the cutting element 10 is then performed.

Optionally, the catalyst material 24 (e.g., a portion of the binder 24') may be removed from the as-formed polycrystalline hard material 12 after the HTHP process using processes known in the art. For example, a leaching process may be used to remove the catalyst material 24 from the interstitial spaces 22 between the grains 18 of diamond material and crushed diamond nanoparticles 19 in at least a portion of the polycrystalline hard material 12. By way of example and not limitation, a portion of the polycrystalline hard material 12 may be leached using a leaching agent and process such as those described more fully in, for example, U.S. Pat. No. 5,127,923, previously incorporated herein by reference, and U.S. Pat. No. 4,224,380, issued Sep. 23, 1980, and titled "Temperature Resistant Abrasive Compact and Method for Making Same," the disclosure of which is incorporated herein in its entirety by this reference. Specifically, aqua regia (a mixture of concentrated nitric acid (HNO$_3$) and concentrated hydrochloric acid (HCl)) may be used to at least substantially remove catalyst material 24 from the interstitial spaces 22. It is also known to use boiling hydrochloric acid (HCl) and boiling hydrofluoric acid (HF) as leaching agents. One particularly suitable leaching agent is hydrochloric acid (HCl) at a temperature of above about 110° C., which may be provided in contact with the polycrystalline hard material 12 for a period of about two (2) hours to about sixty (60) hours, depending upon the size of the body of polycrystalline hard material 12. After leaching the polycrystalline hard material 12, the interstitial spaces 22 between the inter-bonded grains 18 of hard material within the polycrystalline hard material 12 subjected to the leaching process may be at least substantially free of catalyst material 24 used to catalyze formation of inter-granular bonds 26 between the grains in the polycrystalline hard material 12. The leaching process may be applied to only a portion of the polycrystalline hard material 12, or to the entire body of the polycrystalline hard material 12.

Figure 3:
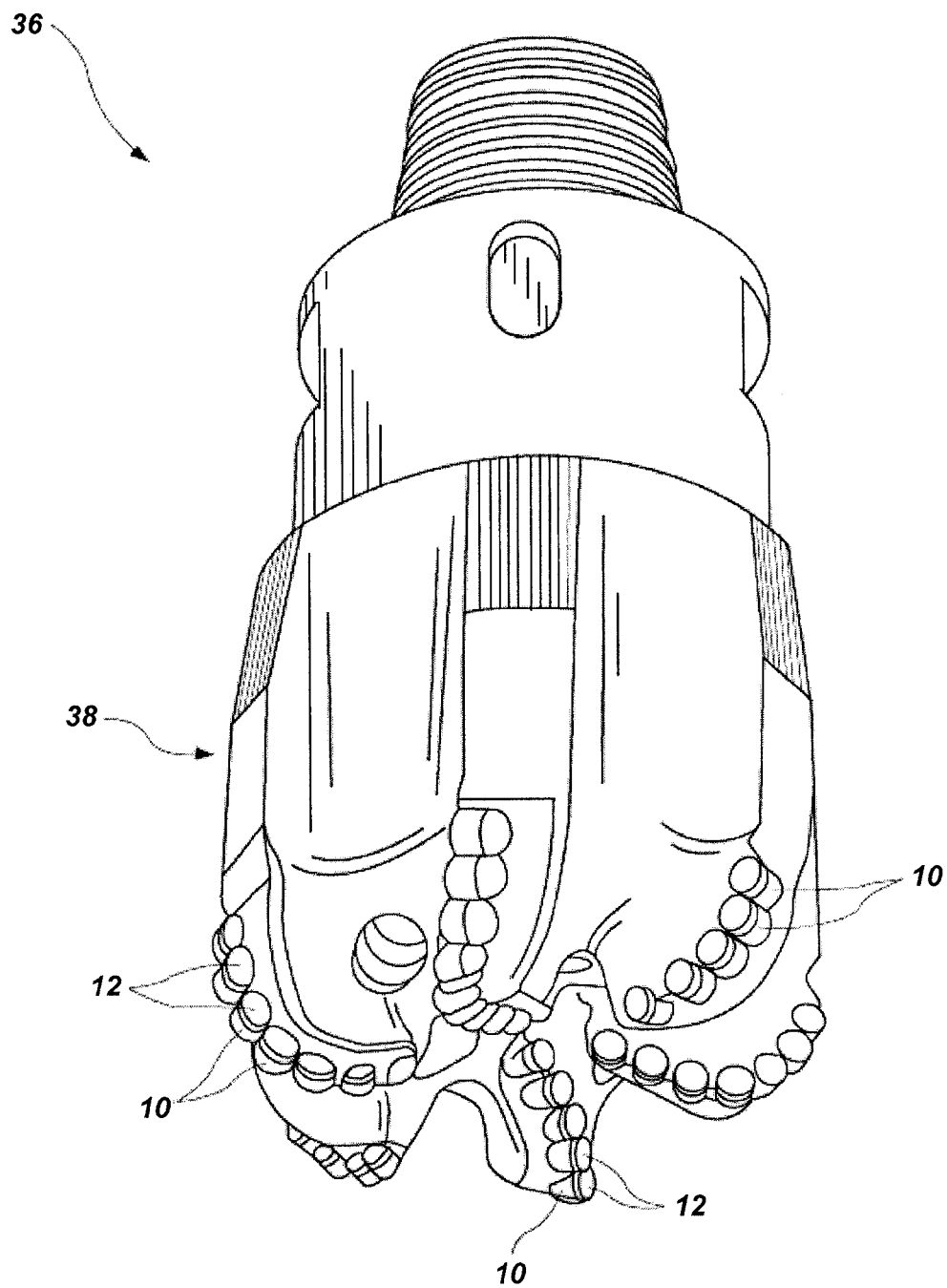
FIG. 3 is a perspective view of an embodiment of a fixed-cutter earth-boring rotary drill bit that includes a plurality of polycrystalline compacts like the polycrystalline compact in FIGS. 1A and 1B.

Embodiments of cutting elements 10 of the present disclosure that include a polycrystalline compact comprising polycrystalline hard material 12 formed of inter-bonded micron-sized grains 18 of diamond material and crushed diamond nanoparticles 19, as previously described herein, such as the cutting element 10 illustrated in FIG. 1A, may be formed and secured to an earth-boring tool such as a rotary drill bit, a percussion bit, a coring bit, an eccentric bit, a reamer tool, a milling tool, etc., for use in forming wellbores in subterranean formations. As a non-limiting example, FIG. 3 illustrates a fixed cutter type earth-boring rotary drill bit 36 that includes a plurality of cutting elements 10, each of which includes a polycrystalline compact comprising polycrystalline hard material 12 on a substrate 16, as previously described herein. The earth-boring rotary drill bit 36 includes a bit body 38, and the cutting elements 10, which include polycrystalline hard material 12 (see FIG. 1A), are bonded to the bit body 38. The cutting elements 10 may be brazed (or otherwise secured) within pockets formed in the outer surface of the bit body 38.

The use of crushed diamond nanoparticles 119 in the formation of cutting elements 10 may result in polycrystalline hard material 12 having crushed diamond nanoparticles 19 remaining after HPHT processing. The crushed diamond nanoparticles 19 of the polycrystalline hard material 12 may increase the overall density and abrasion resistance of the polycrystalline hard material 12. Because crushing may form diamond nanoparticles having relatively lower concentrations of non-diamond carbon than other methods of forming diamond nanoparticles, the resulting polycrystalline hard material 12 may be relatively more pure than polycrystalline hard materials formed from other types of diamond nanoparticles (e.g., detonation nanodiamond tends to include polycrystalline nanodiamond agglomerates and non-diamond carbon). During the formation of polycrystalline hard material 12 from crushed diamond nanoparticles 119, dissolution of diamond (including the crushed diamond nanoparticles 119) in the binder may occur at a lower rate than in conventional processes. Thus, polycrystalline hard materials 12 formed from crushed diamond nanoparticles 19 may have more diamond nanoparticles 19 remaining after HPHT processing than similar polycrystalline hard materials formed from similar amounts of other types of diamond nanoparticles. Furthermore, the crushed diamond nanoparticles 19 remaining after HPHT processing may be closer to the size of the crushed diamond nanoparticles 119 than would be expected when other types of diamond nanoparticles are used.

Polycrystalline hard materials that include crushed diamond nanoparticles in interstitial spaces between and bonded to the inter-bonded, larger grains of diamond material, as described herein, may exhibit improved thermal stability and improved mechanical durability in terms of abrasion resistance and impact resistance, relative to previously known polycrystalline hard materials. By including crushed diamond nanoparticles in the interstitial spaces between the inter-bonded grains of hard material, less catalyst material may be disposed in interstitial spaces between the grains in a resulting polycrystalline hard material, which may improve one or both of the thermal stability and the mechanical durability of the ultimate polycrystalline hard material.

Additional non-limiting example embodiments of the disclosure are described below.

Embodiment 1

A method of fabricating polycrystalline diamond comprising encapsulating micron-sized diamond grains and crushed diamond nanoparticles in a canister and subjecting the micron-sized diamond grains and the crushed diamond nanoparticles in the presence of a binder to a pressure of at least 5.0 GPa and a temperature of at least 1000° C. to form inter-granular bonds between the micron-sized diamond grains and the crushed diamond nanoparticles.

Embodiment 2

The method of Embodiment 1, wherein encapsulating micron-sized diamond grains and crushed diamond nanoparticles in a canister comprises mixing the binder with the micron-sized diamond grains and the crushed diamond nanoparticles.

Embodiment 3

The method of Embodiment 1 or Embodiment 2, further comprising at least partially filling a volume between the micron-sized diamond grains with the binder.

Embodiment 4

The method of any of Embodiments 1 through 3, wherein encapsulating micron-sized diamond grains and crushed diamond nanoparticles in a canister comprises encapsulating micron-sized diamond grains having an average particle diameter of about 1 mm or less with crushed diamond nanoparticles having an average particle diameter of about 500 nm or less.

Embodiment 5

The method of any of Embodiments 1 through 4, wherein encapsulating micron-sized diamond grains and crushed diamond nanoparticles in a canister comprises encapsulating micron-sized diamond grains with a plurality of single-crystal crushed diamond nanoparticles.

Embodiment 6

The method of any of Embodiments 1 through 5, wherein encapsulating micron-sized diamond grains and crushed diamond nanoparticles in a canister comprises encapsulating micron-sized diamond grains with functionalized crushed diamond nanoparticles.

Embodiment 7

The method of any of Embodiments 1 through 6, further comprising leaching at least a portion of the binder from the polycrystalline diamond.

Embodiment 8

The method of any of Embodiments 1 through 7, wherein subjecting the micron-sized diamond grains and the crushed diamond nanoparticles in the presence of a binder to a pressure of at least 5.0 GPa and a temperature of at least 1000° C. comprises forming inter-granular bonds between the micron-sized diamond grains and the crushed diamond nanoparticles without consuming the crushed diamond nanoparticles.

Embodiment 9

The method of any of Embodiments 1 through 8, wherein subjecting the micron-sized diamond grains and the crushed diamond nanoparticles in the presence of a binder to a pressure of at least 5.0 GPa and a temperature of at least 1000° C. comprises subjecting the micron-sized diamond grains and the crushed diamond nanoparticles in the presence of a metallic binder to a pressure of at least 5.0 GPa and a temperature of at least 1000° C.

Embodiment 10

A polycrystalline compact comprising a plurality of grains of diamond material and a plurality of crushed diamond nanoparticles disposed in interstitial spaces between, and bonded to, the plurality of grains of diamond material. The plurality of crushed diamond nanoparticles is bonded to the grains of diamond material by subjecting the crushed diamond nanoparticles and the grains of diamond material in the presence of a binder to a pressure of at least 5.0 GPa and a temperature of at least 1000° C.

Embodiment 11

The polycrystalline compact of Embodiment 10, wherein the polycrystalline compact is formed by encapsulating the plurality of grains of diamond material and the plurality of crushed diamond nanoparticles in a canister.

Embodiment 12

The polycrystalline compact of Embodiment 10 or Embodiment 11, wherein the polycrystalline compact is formed by mixing the binder with the plurality of grains of diamond material and the plurality of crushed diamond nanoparticles.

Embodiment 13

The polycrystalline compact of any of Embodiments 10 through 12, wherein the polycrystalline compact is formed by at least partially filling a volume between the plurality of grains of diamond material with the binder.

Embodiment 14

The polycrystalline compact of any of Embodiments 10 through 13, wherein the plurality of crushed diamond nanoparticles has an average particle diameter of about 500 nm or less.

Embodiment 15

The polycrystalline compact of Embodiment 14, wherein the plurality of crushed diamond nanoparticles has an average particle diameter from about 5 nm to about 150 nm.

Embodiment 16

The polycrystalline compact of any of Embodiments 10 through 15, wherein the plurality of crushed diamond nanoparticles comprises a plurality of single-crystal diamond particles.

Embodiment 17

The polycrystalline compact of any of Embodiments 10 through 16, wherein the polycrystalline compact is formed by leaching at least a portion of the binder from the polycrystalline compact.

Embodiment 18

The polycrystalline compact of any of Embodiments 10 through 17, wherein the polycrystalline compact is substantially free of non-diamond carbon.

Embodiment 19

The polycrystalline compact of any of Embodiments 10 through 18, wherein the plurality of crushed diamond nanoparticles is bonded to the grains of diamond material by subjecting the crushed diamond nanoparticles and the grains of diamond material in the presence of a metallic binder to a pressure of at least 5.0 GPa and a temperature of at least 1000° C.

Embodiment 20

An earth-boring tool comprising a bit body and a polycrystalline diamond compact secured to the bit body. The polycrystalline diamond compact comprises a plurality of grains of diamond material and a plurality of crushed diamond nanoparticles disposed in interstitial spaces between and bonded to, the grains of diamond material. The plurality of diamond nanoparticles is bonded to the grains of diamond material by subjecting the crushed diamond nanoparticles and the grains of diamond material in the presence of a binder to a pressure of at least 5.0 GPa and a temperature of at least 1000° C.

Embodiment 21

The earth-boring tool of Embodiment 20, wherein the polycrystalline compact is formed by encapsulating the plurality of grains of diamond material and the plurality of crushed diamond nanoparticles in a canister.

Embodiment 22

The earth-boring tool of Embodiment 20 or Embodiment 21, wherein the polycrystalline compact is formed by mixing the binder with the plurality of grains of diamond material and the plurality of diamond nanoparticles.

Embodiment 23

The earth-boring tool of any of Embodiments 20 through 22, wherein the polycrystalline compact is formed by at least partially filling a volume between the plurality of grains of diamond material with the binder.

Embodiment 24

The earth-boring tool of any of Embodiments 20 through 23, wherein the polycrystalline compact comprises a leached polycrystalline compact.

Embodiment 25

The earth-boring tool of any of Embodiments 20 through 24, wherein the polycrystalline compact is substantially free of non-diamond carbon.

Embodiment 26

The earth-boring tool of any of Embodiments 20 through 25, wherein the plurality of crushed diamond nanoparticles is bonded to the grains of diamond material by subjecting the crushed diamond nanoparticles and the grains of diamond material in the presence of a metallic binder to a pressure of at least 5.0 GPa and a temperature of at least 1000° C.

While the present disclosure has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor. Further, embodiments of the disclosure have utility with different and various bit profiles, as well as various cutting element types and configurations.

What is claimed is:

1. A method of fabricating a cutting element, comprising:
   crushing diamond grains to form crushed diamond nanoparticles consisting essentially of diamond carbon, the crushed diamond nanoparticles having an average particle diameter of about 500 nm or less;
   after crushing the diamond grains to form the crushed diamond nanoparticles, mixing the crushed diamond nanoparticles with micron-sized diamond grains having an average particle diameter of about 1 μm to about 250 μm and encapsulating the crushed diamond nanoparticles with the micron-sized diamond grains in a canister; and
   subjecting the crushed diamond nanoparticles and micron-sized diamond grains to a pressure of at least 5.0 GPa and a temperature of at least 1000° C. in the presence of a binder to form a polycrystalline diamond compact having inter-granular bonds between the micron-sized diamond grains and the crushed diamond nanoparticles.

2. The method of claim 1, wherein encapsulating the crushed diamond nanoparticles with the micron-sized diamond grains in a canister comprises mixing the binder with the crushed diamond nanoparticles with the micron-sized diamond grains in the canister.

3. The method of claim 1, further comprising at least partially filling a volume between the micron-sized diamond grains with the binder.

4. The method of claim 1, wherein encapsulating the crushed diamond nanoparticles with the micron-sized diamond grains in a canister comprises encapsulating crushed diamond nanoparticles having an average particle diameter from about 5 nm to about 150 nm with the micron-sized diamond grains in the canister.

5. The method of claim 1, wherein encapsulating the crushed diamond nanoparticles with the micron-sized diamond grains in a canister comprises encapsulating the micron-sized diamond grains with a plurality of single-crystal crushed diamond nanoparticles in the canister.

6. The method of claim 1, wherein encapsulating the crushed diamond nanoparticles with the micron-sized diamond grains in a canister comprises encapsulating the micron-sized diamond grains with functionalized crushed diamond nanoparticles in the canister.

7. The method of claim 1, further comprising leaching at least a portion of the binder from the polycrystalline diamond compact.

8. The method of claim 1, wherein subjecting the crushed diamond nanoparticles and micron-sized diamond grains in the presence of a binder to a pressure of at least 5.0 GPa and a temperature of at least 1000° C. comprises forming inter-granular bonds between the micron-sized diamond grains and the crushed diamond nanoparticles without consuming the crushed diamond nanoparticles.

9. The method of claim 1, further comprising providing the polycrystalline diamond compact on a support substrate.

10. The method of claim 1, further comprising after crushing the diamond grains to form the crushed diamond nanoparticles, mixing the crushed diamond nanoparticles and the micron-sized diamond grains with submicron-sized diamond particles having an average particle diameter from about 500 nm to about 1 μm and encapsulating the crushed diamond nanoparticles, the micron-sized diamond grains, and the submicron-sized diamond particles in the canister.

11. A method of fabricating a cutting element, comprising:
   mixing previously crushed diamond nanoparticles with micron-sized diamond grains to form a particulate mixture, the previously crushed diamond nanoparticles consisting essentially of diamond carbon and having an average particle diameter of about 500 nm or less before mixing, the micron-sized diamond grains having an average particle diameter of about 1 μm to about 250 μm before mixing;
   encapsulating the particulate mixture in a canister such that the micron-sized diamond grains have a packing fraction from about 80% to about 99% with a void space defined by the micron-sized diamond grains, and wherein the previously crushed diamond nanoparticles substantially fill the void space defined by the micron-sized diamond grains;
   subjecting the particulate mixture to a pressure of at least 5.0 GPa and a temperature of at least 1000° C. in the presence of a binder to form a polycrystalline diamond compact having inter-granular bonds between the micron-sized diamond grains and the previously crushed diamond nanoparticles; and
   providing the polycrystalline diamond compact on a support substrate.

12. The method of claim 11, further comprising mixing the binder with the micron-sized diamond grains and the previously crushed diamond nanoparticles.

13. The method of claim 11, further comprising at least partially filling a volume between the micron-sized diamond grains with the binder.

14. The method of claim 11, wherein the previously crushed diamond nanoparticles have an average particle diameter from about 5 nm to about 150 nm before mixing.

15. The method of claim 11, wherein the previously crushed diamond nanoparticles comprise a plurality of single-crystal previously crushed diamond nanoparticles before mixing.

16. The method of claim 11, wherein the previously crushed diamond nanoparticles comprise functionalized previously crushed diamond nanoparticles before mixing.

17. The method of claim 11, further comprising leaching at least a portion of the binder from the polycrystalline diamond compact.

18. The method of claim 11, wherein subjecting the particulate mixture to a pressure of at least 5.0 GPa and a temperature of at least 1000° C. in the presence of a binder comprises forming inter-granular bonds between the micron-sized diamond grains and the previously crushed diamond nanoparticles without consuming the previously crushed diamond nanoparticles.

* * * * *

UNITED STATES PATENT AND TRADEMARK OFFICE
CERTIFICATE OF CORRECTION

PATENT NO. : 10,030,450 B2
APPLICATION NO. : 13/935263
DATED : July 24, 2018
INVENTOR(S) : Anthony A. DiGiovanni Page 1 of 1

It is certified that error appears in the above-identified patent and that said Letters Patent is hereby corrected as shown below:

In the Specification

Column 7, Line 28, change "canister 118 may" to --canister 100 may--

Signed and Sealed this
Eleventh Day of December, 2018

Andrei Iancu
*Director of the United States Patent and Trademark Office*